United States Patent [19]
Kosuge et al.

[11] Patent Number: 5,147,442
[45] Date of Patent: Sep. 15, 1992

[54] COATED GRANULAR FERTILIZER

[75] Inventors: Nobumasa Kosuge; Toshio Fujita, both of Kitakyushushi; Yoshisato Yamashita, Minamatashi; Shigemitsu Yoshida, Minamatashi; Katsutoshi Yamahira, Minamatashi; Sayoko Miyoshi, Kitayushushi, all of Japan

[73] Assignee: Chisso Corporation, Osaka, Japan

[21] Appl. No.: 306,897

[22] Filed: Feb. 7, 1989

[51] Int. Cl.$^5$ .................... C05G 3/10; C05G 5/00
[52] U.S. Cl. ...................... 71/64.07; 71/64.11; 71/27
[58] Field of Search ............... 71/64.07, 64.11

[56] References Cited

U.S. PATENT DOCUMENTS 4,772,490  9/1988  Kogler et al. ............... 71/64.07 X

FOREIGN PATENT DOCUMENTS 0090495  7/1980  Japan ........................ 71/64.07

OTHER PUBLICATIONS

CA108(19): 166574p, Shima et al, 1987 "Sustained-release ... polymers".

Primary Examiner—Ferris Lander
Attorney, Agent, or Firm—Fred Philpitt

[57] ABSTRACT

A coated or encapsulated granular fertilizer which comprises an olefin polymer and/or copolymer and a polyether polyol in a defined amount. The olefin polymer is an ethylene or propylene homopolymer and/or a copolymer of an olefin monomer and a copolymerizable monomer such as olefinic monomers, vinyl acetate and carbon monoxide. The polyether polyol is polymers of ethylene oxide, propylene oxide and mixtures thereof with or without etherification with polyhydric alcohols. By the addition of the polyether polyol, a dissolution rate of the fertilizer can be arbitrarily controlled without a sacrifice of physical properties of the coated film.

13 Claims, 3 Drawing Sheets

COATED GRANULAR FERTILIZER

BACKGROUND OF THE INVENTION

1. Field of the Invention

This invention relates to the art of fertilizer and, more particularly, to a coated granular fertilizer in which the dissolution rates of water-soluble fertilizer components are controlled by coating or encapsulating a quick-acting granular fertilizer with a water-resistant film on the surfaces thereof.

2. Description of the Prior Art

In recent years, encapsulated or coated granular fertilizers have been in use wherein the granular fertilizer is encapsulated so that effective fertilizer components are controlled in dissolution rate.

We proposed a series of techniques for coated fertilizers using olefin polymers and copolymers (which may be hereinafter referred to simply as olefin polymer) as essential ingredients for a coating film. For instance, Japanese Patent Publication Nos. 50-99,858 and 60-3,040, assigned to the present assignee, disclose coating methods and coated fertilizers wherein olefin polymers with or without inorganic fillers are used as an encapsulating material.

For facilitating dissolution of the coated fertilizers, the Japanese Patent Publication Nos. 50-99,858 and 54-3,104 describe the use of nonionic surface active agents. Moreover, Japanese Patent Publication No. 60-37,074 describes the control of the dissolution rates by using a mixture of an ethylene-vinyl acetate copolymer and an olefin polymer at a suitable ratio.

According to these patent publications, in order to properly control the dissolution rates by covering a granular fertilizer with polymer compositions comprised primarily of olefin polymer and copolymer and an inorganic filler, it is necessary to balance the following requirements: (1) the ratio between an olefin polymer and an ethylene-vinyl acetate copolymer; (2) a content of surface active agent; and (3) a content of inorganic filler.

However, the control of the dissolution rates by varying the proportions or contents of the ingredients in these compositions places limitation on the maintenance of properties of the coating film. For instance, if the content of inorganic filler is increased, the dissolution rate increases with a lowering of film strength, thus presenting a problem of breakage during handling. Therefore, it is not convenient to increase the filler to a substantial extent.

Although it is ordinarily preferable to control the dissolution rates by varying the ratio between the olefin polymer and the ethylene-vinyl acetate copolymer, this ratio is eventually determined by setting a dissolution rate of an effective fertilizer component. The attendant problem is that the physical and mechanical properties of the resultant film are also disadvantageously determined.

For instance, it is necessary to increase the ratio of the ethylene-vinyl acetate copolymer so as to increase the dissolution rate. The resultant film becomes soft. In coated fertilizers having different dissolution rates of the respective effective fertilizer components, it is not favorable from the standpoint of quality control that the coating films for the respective components have different physical properties. This may be overcome by controlling an amount of a surface active agent used. However, if surface active agents are used in large amounts in the olefin polymer film, there will arise the problem that the film is cracked owing to stress cracking with a loss of coating performance.

These problems may be solved when using in combination a soft polymer such as an ethylene-vinyl acetate copolymer, but if the surface active agent used is present around coated fertilizer granules in large amounts, the dissolution rate is facilitated. In commercial fertilizer products, the surface active agent is added in amounts within a range not presenting any problem on the dissolution rate. The control of the dissolution rate by incorporation of surface active agents in large amounts thus involves a problem on stability.

SUMMARY OF THE INVENTION

It is accordingly an object of the invention to provide a coated or encapsulated granular fertilizer in which granules of a fertilizer are individually covered with a resin composition whereby problems of stress cracking and dissolution stability involved in the prior art coated granular fertilizers can be appropriately solved.

It is another object of the invention to provide a coated granular fertilizer in which granules of a fertilizer are individually covered with a film of a resin composition comprised of an olefin polymer and an olefin copolymer such as an ethylene-vinyl acetate copolymer along with a polyether polyol.

The above objects can be achieved according to the invention by a coated granular fertilizer which comprises granules of a fertilizer, and a film of a resin composition covering the individual granules therewith, the resin composition comprising an olefin polymer and a polyether polyol used in an amount of from 0.1 to 10 wt % of the resin composition whereby the dissolution rate of the granular fertilizer is arbitrarily controlled by controlling the amount of the polyether polyol within the above-defined range. The physical properties of the film depend almost solely on the combination of the olefin homopolymer and copolymer and the dissolution rate can be arbitrarily controlled by controlling the amount of the polyether polyol.

DETAILED DESCRIPTION OF THE INVENTION

Figure 1:
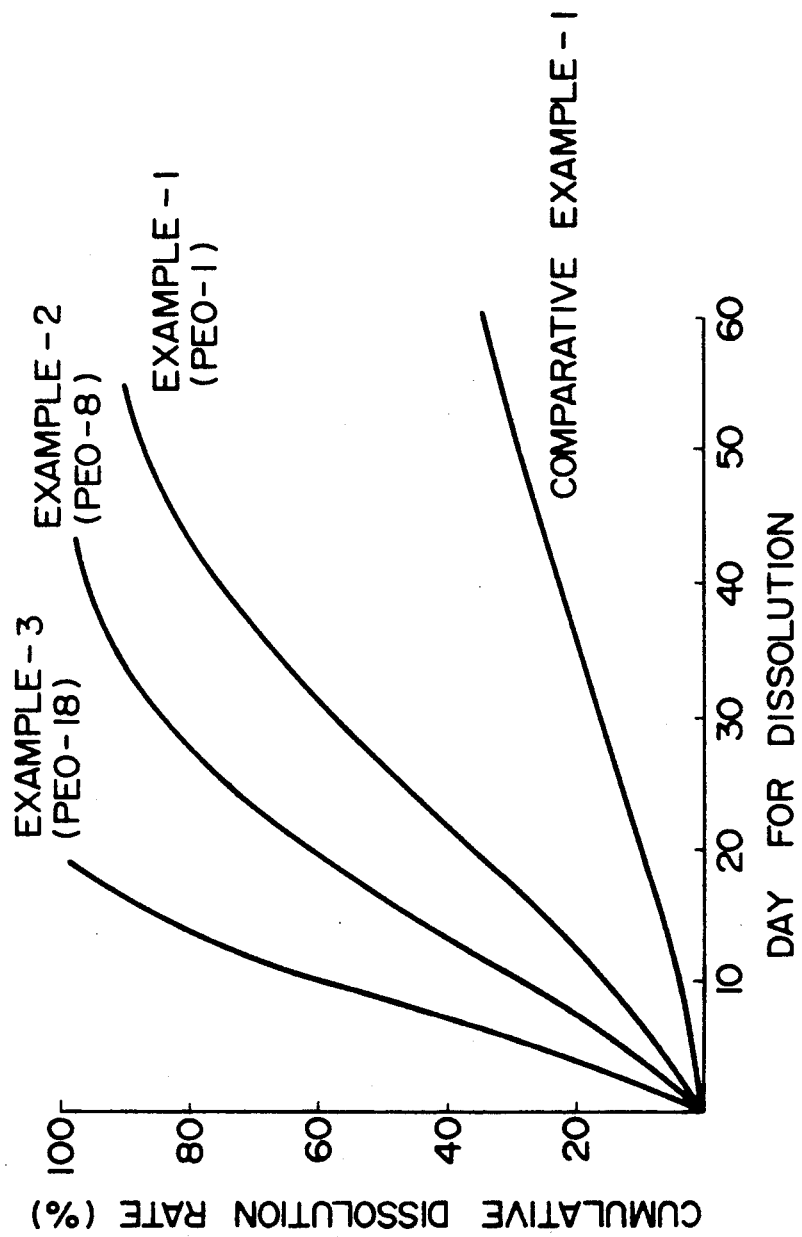
FIG. 1 is a graphical representation of a cumulative dissolution rate in relation to the variation in day for the dissolution for different coated granular fertilizers.

The coated granular fertilizer according to the invention should comprise a granular fertilizer to be covered with a resin composition. The granular fertilizer used in the present invention is not critical with respect to the type and may be any known chemical fertilizers. Examples of the fertilizer include ammonium sulfate, ammonium chloride, ammonium nitrate, urea, potassium chloride, potassium sulfate, potassium nitrate, sodium nitrate, ammonium phosphate, potassium phosphate, calcium phosphate, and composite fertilizers thereof.

The granular fertilizer is coated with a water-resistant film-forming resin composition. The composition should essentially comprise an olefin polymer and optionally, other polymers, waxes, inorganic and organic powders and surface active agents. In addition, a polyether polyol should be contained in the resin composition as will be described hereinafter.

The olefin polymer essentially used in the practice of the invention may be a homopolymer or copolymer. The olefin homopolymer includes an ethylene polymer and a propylene polymer. The olefin copolymers include copolymers mainly composed of ethylene and/or propylene such as ethylene-propylene copolymers, ethylene-propylene-butene copolymers, ethylene-vinyl acetate copolymers which have a content of vinyl acetate of not larger than 5 wt %, ethylene-carbon monoxide copolymers and the like. These polymers may be used singly or in combination. If these polymers are used in combination, an olefin homopolymer and an olefin copolymer are preferably used. In this case, the olefin homopolymer and copolymer may be used at an arbitrary ratio and is generally at a ratio of 9 to 1:1 to 9 on the weight basis.

Optional ingredients are described.

Polymers other than those essentially used in the present invention may be added without limitation provided that they can be dissolved or dispersed in a coating solution containing the essential olefin polymer. The olefin polymer is usually dissolved in weakly polar organic solvents. Accordingly, the additive polymers should preferably be dissolved in such weakly polar organic solvents.

Examples of the additive polymers include rubbers such as styrene-butadiene rubbers, butadiene rubber, isoprene rubber, chloroprene rubber, butyl rubber and the like, elastomers such as styrene-butadiene elastomers, styrene-isoprene elastomers, 1,2-polybutadiene elastomer, ethylene-vinyl acetate copolymer elastomers, and thermoplastic resins such as styrene polymer, vinylidene chloride polymer, vinylidene chloride-vinyl chloride copolymers, methyl methacrylate resin and the like.

The waxes used in the present invention may be any waxes provided that they are soluble in solvents for the essential polymers. Examples of such waxes include paraffin wax, hardened oils, bee wax, Japan wax, rosin, petroleum resins and the like.

Inorganic and organic powders useful in the present invention are not critical so far as they are dispersable in the coating solution. In this connection, however, powders having a large size are not suitable for the purpose of coating and should have a size smaller than a thickness of the film of the coated granular fertilizer. In general, the size is not larger than the half the thickness, preferably ¼ of the thickness. The thickness of the coated film is generally in the range of from 10 to 200 micrometers.

The dispersability in the coating solution becomes better when a powder has better affinity for the solvent. If the affinity is poor, this can be improved, for example, by coating the powder on the surface thereof with a silicone. Such a surface treatment enables one to use any powders. Preferable inorganic powders include talc, calcium carbonate, diatomaceous earth, kaolin, bentonite, silica, metal oxides, and the like, of which talc is most preferable. The other powders should preferably be used after treatment with silicones.

Preferable organic powders are those of starch, crotylidene diurea and the like. These powders should also be favorably treated with silicones.

These additives may be used in amounts which depend upon the purpose of a final coated granular fertilizer. Moreover, in order to control the dissolution rate or impart hydrophilic properties, surface active agents may be added to the coating solution.

The coating compositions comprising the ingredients described above are known. The granular fertilizer according to the invention is characterized in that the fertilizer is covered or coated with coating compositions in which polyether polyols are added to the known coating compositions.

The polyether polyols used in the practice of the invention are compounds which have an ether bond in the molecule and an OH group at an end of the molecule. Typical examples of the compound are polyethylene oxide and polypropylene oxide of the following general formula

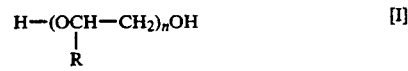

More complicated compounds of the following formula [II] wherein the terminal group of a polyalkylene oxide combines with other functional groups may also be included within the scope of the invention.

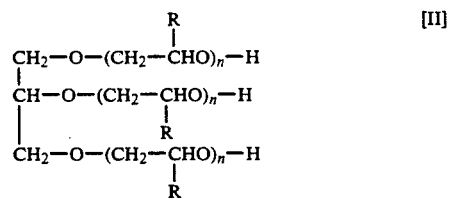

In the formulae [I] and [II], each R represents a hydrogen atom or an alkyl group having from 1 to 3 carbon atoms and n is an integer of from 1 to 100, referably from 1 to 50. In the practice of the invention, useful polyether polyols include polyethylene oxide, polypropylene oxide, ethylene oxide-propylene oxide copolymers, ether products between the above oxides and polyhydric alcohols, and mixtures thereof. Examples of the polyhydric alcohols include ethylene glycol, propylene glycol and butylene glycol. Further example is polyethylenepropylene glycol derived from said glycols.

These polyether polyols may be used singly or in combination in an amount of from 0.01 to 10 wt % of the coating composition.

The coated fertilizer where a granular fertilizer is covered or encapsulated with a water-resistant film may be produced by various known methods. In the case where a preferable combination of olefin homopolymer and copolymer are used in the coating composition, a jet coating method as disclosed in Japanese Patent Publication No. 60-3,040 is most preferred.

In this method, starting materials including the olefin polymer and copolymer are dissolved or dispersed in organic solvents. The resultant solution or dispersion is sprayed over a granular fertilizer in a jet flow state, thereby covering the fertilizer with the solution. The polyether polyol is used after uniform dissolution or dispersion in the solvent and is thus uniformly dispersed in the film formed by the method.

Although an appropriate combination of a polyether polyol with a solvent may be considered with respect to the solubility, little problem is involved in the solubility and dispersability of the polyether polyol unless the polyether polyol used has a very high molecular weight. This is because the amount of the polyether polyol is relatively small.

The film coated on a granular fertilizer has a polyether polyol dispersed therein, and when the amount of the polyether polyol increases, the dissolution rate increases. Thus, the dissolution rate can be controlled by changing the amount of polyether polyol. In addition, the incorporation of a polyether polyol within the above-defined range rarely influences the physical properties of the film. Thus, the control of the dissolution rate can be realized without a sacrifice of physical properties of the film.

The polyether polyol is advantageous over surface active agents in that stress cracking on olefin polymers and an undesirable effect of facilitating the dissolution of fertilizer components as will occur with use of surface active agents are not involved. Accordingly, the dissolution of effective components can be stabilized. The dissolution is more facilitated when using a larger amount of a polyether polyol with a higher degree of polymerization.

With regard to the type of alkyl group as a substituent of polyalkylene oxides, a lower alkyl group gives a better effect of the dissolution if miscibility with olefin polymer and copolymer is not taken into account. In this sense, polyethylene oxide exhibits the highest effect of facilitating the dissolution.

The present invention is described in more detail by way of examples.

EXAMPLES-I

In the examples-I, coated or encapsulated granular fertilizers of the invention and for comparison and a method for producing the same are described, wherein a jet flow coating apparatus is used to make instantaneous drying conditions.

Figure 3:
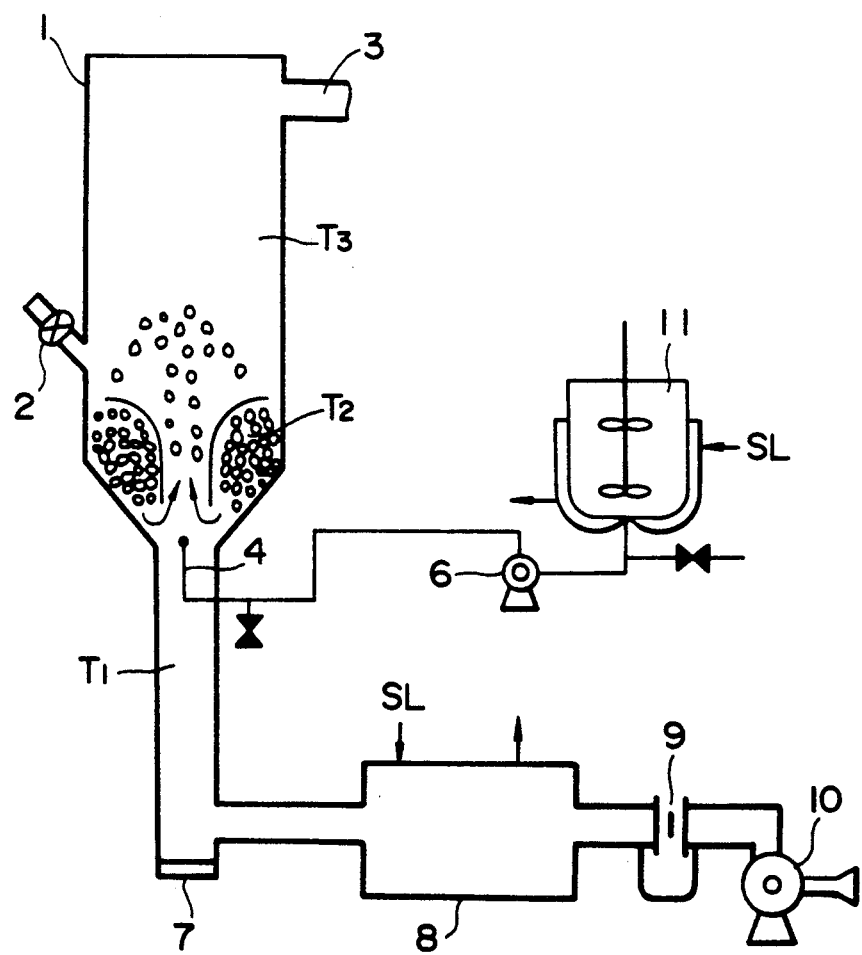
FIG. 3 is a flow chart of a jet coating apparatus used in Examples and Comparative Examples.

FIG. 3 shows a jet flow encapsulating apparatus used in the example. The apparatus includes a jet flow column 1 having a diameter of 250 mm, a height of 200 mm, an air jetting diameter of 50 mm and an angle of the cone of 50°, a fertilizer charging port 2 and an exhaust port 3. An air jet is passed from a blower 10 through an orifice flow meter 9 and a heat exchanger 8 into the jet flow column 1. The flow rate and the temperature of the air are controlled by means of the flow meter 9 and the heat exchanger 8, respectively, and an exhaust is discharged from the port 3 to outside. A granular fertilizer to be used for encapsulation is charged from the fertilizer charging port 2 while passing hot air with a given temperature so that it forms a granular fertilizer flow. The hot air temperature, temperature of the granules being encapsulated and exhaust temperature are detected by means of thermometers $T_1$, $T_2$ and $T_3$, respectively. When $T_3$ reaches a predetermined temperature, an encapsulating solution is sprayed against the fertilizer flow through a one fluid nozzle 4. The encapsulating solution is agitated in a solution tank 11 so that when a powder is used, it is uniformly dispersed and is passed by the use of a pump 6. In order to keep the temperature of the solution at not lower than 100° C. until the solution reaches the nozzle, a double tube is used through which steam is passed. When a predetermined encapsulation rate is accomplished, the blower is stopped and a coated or encapsulated fertilizer is withdrawn from a withdrawal port.

In the examples, encapsulation was performed under the following fundamental conditions.
One fluid nozzle: opening 0.8 mm, full con type
Amount of hot air: 4 m²/minute
Temperature of hot air: 100° C.±2° C.
Type of fertilizer: 5–8 mesh granular urea
Charge of the fertilizer: 10 kg
Concentration of encapsulating solution solid content 2.5 wt %
Type of test solvent: tetrachloroethylene
Feed of encapsulating solution: 0.5 kg/minute
Encapsulating time: 40 minutes
Encapsulating rate (relative to the fertilizer): 5.0%

Coated granular fertilizers of the invention and for comparison were prepared using compositions indicated in Table 1 below.

TABLE 1

| Example No. | Coating Composition (wt %) | | | | |
|---|---|---|---|---|---|
| | Essential Polymer | Polymer Used in Combination | Powder | Other Additive | Polyether Polyol |
| Com. Ex. 1 | PE*-1 | EVA*-2 | Talc*-3 | SA*-4 | 0 |
| | 40 | 0 | 60 | 0 | |
| Ex. 1 | " | " | " | " | PEO-1*-5 |
| | " | " | " | " | 1 |
| Ex. 2 | " | " | " | " | PEO-8*-6 |
| | " | " | " | " | 1 |
| Ex. 3 | " | " | " | " | PEO-18*-18 |
| | " | " | " | " | 1 |
| Com. Ex. 2 | " | " | " | " | |
| | 30 | 10 | " | 1 | 0 |
| Ex. 4 | " | " | " | " | PEO-1 |
| | " | " | " | " | 1 |
| Com. Ex. 3 | ECO*-8 | ECOVA*-9 | CaCO₃*-10 | " | |
| | 60 | 10 | 30 | 1 | 0 |
| Ex. 5 | " | " | " | " | PPO*-11 |
| | " | " | " | " | 1 |
| Ex. 6 | " | " | " | " | PPO*-11 |
| | " | " | " | " | 5 |
| Ex. 7 | " | " | " | " | PPO*-11 |
| | " | " | " | " | 10 |
| Com. Ex. 4 | " | SBS*-9 | Talc*-13 + starch | " | |
| | 30 | 10 | 50 | 0.1 | 0 |
| Ex. 8 | " | " | " | " | Ⓐ*-14 |
| | " | " | " | " | 1 |
| Ex. 9 | " | " | " | " | Ⓑ*-15 |

TABLE 1-continued

| Example No. | Coating Composition (wt %) | | | | |
|---|---|---|---|---|---|
| | Essential Polymer | Polymer Used in Combination | Powder | Other Additive | Polyether Polyol |
| | " | " | " | " | 1 |
| EX. 10 | " | " | " | " | ©*-16 |
| | " | " | " | " | 1 |
| Ex. 11 | " | " | " | " | ⓓ*-17 |
| | " | " | " | " | 1 |
| Ex. 8 | " | " | " | " | ⓔ*-18 |
| | " | " | " | " | 1 |

*-1 polyethylene
*-2 ethylene-vinyl acetate copolymer
*-3 talc
*-4 nonionic surface active agent
*-5 polyethylene oxide with an average molecular weight of 150,000–400,000
*-6 polyethylene oxide with an average molecular weight of 1,700,000–2,200,000
*-7 polyethylene oxide with an average molecular weight of 4,300,000–4,800,000
*-8 ethylene-carbon monoxide copolymer
*-9 ethylene-carbon monoxide-vinyl acetate copolymer
*-10 calcium carbonate
*-11 polypropylene oxide
*-12 1,2-syndiotactic polybutadiene
*-13 corn starch

*-14
$$\begin{array}{l} CH_2O-R_1-H \\ | \\ CHO-R_1-H \\ | \\ CH_2O-R_1-H \end{array}$$

*-15
$$\begin{array}{l} CH_2O-R_1-R_2-H \\ | \\ CHO-R_1-R_2-H \\ | \\ CH_2O-R_1-R_2-H \end{array}$$

*-16
$$CH_3CH_2C\begin{array}{l} \diagup CH_2O-R_1-H \\ -CH_2O-R_1-H \\ \diagdown CH_2O-R_1-H \end{array}$$

*-17
$$CH_3CH_2C\begin{array}{l} \diagup CH_2O-R_1-R_2-H \\ -CH_2O-R_1-R_2-H \\ \diagdown CH_2O-R_1-R_2-H \end{array}$$

*-18
$$\begin{array}{l} CH_2O-R_1-H \\ | \\ CHO-R_1-H \\ | \\ CHO-R_1-H \\ | \\ CHO-R_1-H \\ | \\ CHO-R_1-H \\ | \\ CH_2O-R_1-H \end{array}$$

$\quad\quad\quad\quad CH_3$
$\quad\quad\quad\quad\ |$
$R_1: CH_2CHO$
$R_2: CH_2CH_2O$

EXAMPLES-II 10 g of each of the fertilizers of the invention prepared in Examples-I was immersed in 200 ml of water and allowed to stand at 25° C. After a certain time, the fertilizer and the water were separated from each other to determine dissolve urea by a quantitative analysis. The separated fertilizer was again immersed in 200 ml of fresh water and allowed to stand at 25° C. After a certain time, a similar analysis was effected. The above procedure was repeated and the relation between a cumulative dissolution rate of the urea dissolved in water and the days is plotted to obtain a dissolution rate curve.

FIG. 1 shows a dissolution rate in water at 25° C. for different molecular weights of polyethylene oxide used in the fertilizers prepared in Examples-I. From the results, it will be seen that the effect of facilitating the dissolution is better for a higher degree of polymerization of polyethylene oxide.

Figure 2:
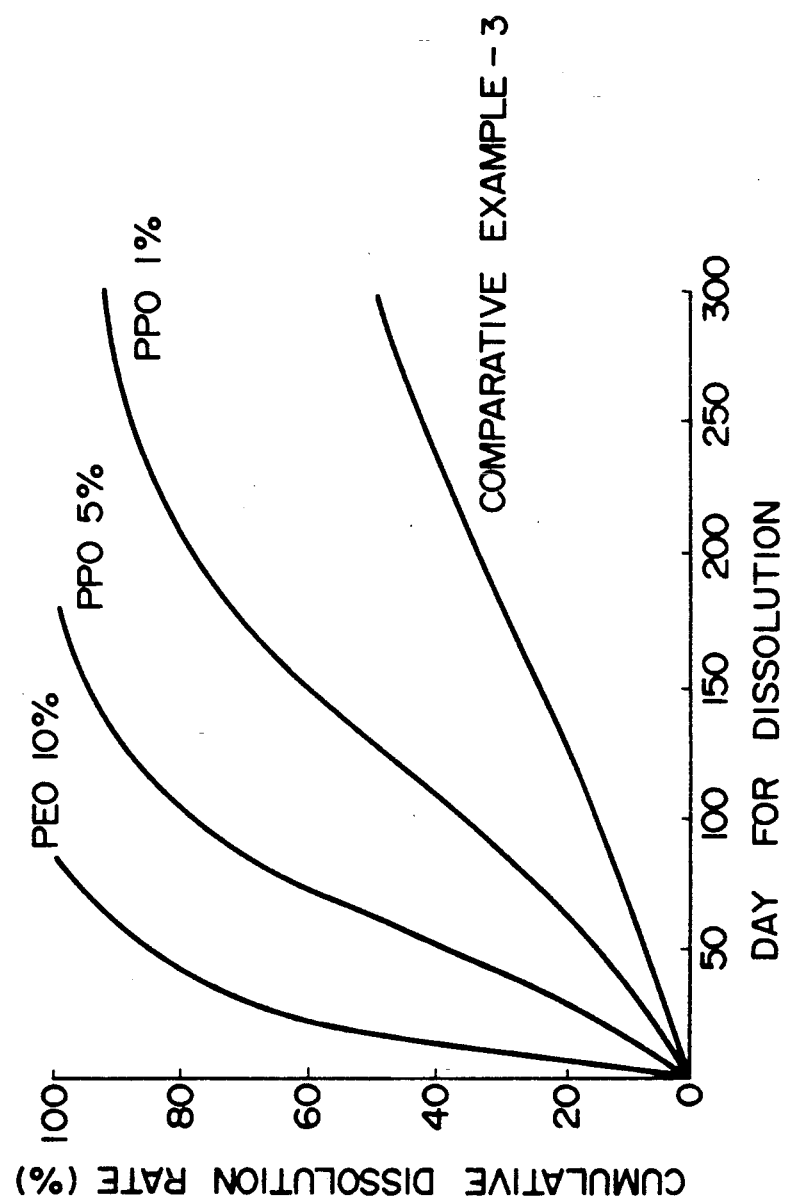
FIG. 2 is a graphical representation of a cumulative dissolution rate in relation to the variation in day for the dissolution for different coated granular fertilizers.

FIG. 2 shows a cumulative dissolution rate for different amounts of polypropylene oxide. The results reveal that the dissolution rate varies depending upon the amount.

EXAMPLES-III

In the same manner as in Examples-I, the following fertilizers were prepared. The dissolution rates in water for these fertilizers were found to be almost at the same level.

TABLE 2

| Example No. | Coating Composition (wt %) | | | | Days Before Dissolution to 80% |
|---|---|---|---|---|---|
| | Talc | PE | EVA | Other | |
| Comp. Ex. 5 | 50 | 25 | 25 | 0 | 118 |
| Comp. Ex. 6 | 50 | 50 | 0 | S.A 2.0 | 120 |
| EX. 13 | 50 | 50 | 0 | PED-1 0.5 | 116 |

In Example 13, the flowability of the granules in the jet flow was good and the granules can flow mechanically. In Comparative Example 5, the flowability was poor with a need of shaking. The flowability in Comparative Example 6 was similar to that of the example, but when the fertilizer was stored in open air, the dissolution was accelerated at 6th month, with a problem of stability.

EXAMPLES-IV

In the same manner as in Examples-I, fertilizers of the following compositions were prepared. These coatings of the fertilizers were subjected to measurement of a degree of degradation according to the method set forth below.

Measurement of a degree of degradation:

Coated granules of fertilizer were cut with a sharp knife at opposite ends thereof and the fertilizer in the granules was dissolved in water to obtain a fine ring with a width of 1.5 mm for use as a sample. The samples were each allowed to stand outdoors and subjected to measurement of tensile strength in relation to days of outdoor exposure. The degree of degradation was determined as the days at which the tensile strength was reduced to about ⅓ of an initial strength.

The results are shown in Table 3, in which the days of dissolution and the degree of degradation are shown relative to concentration of polyethylene oxide and a polypropylene oxide derivative. From the results, it will be seen that the polyethylene oxide facilitates the dissolution and the derivative of polypropylene oxide has an effect of promoting photo-degradation.

TABLE 3

| Example No. | Coating Composition (wt %) | | | | Effects | |
|---|---|---|---|---|---|---|
| | Talc | ECO[*1] | PEO-1[*2] | PPO[*3] derivative | Days Before 80% Dissolution | Degree[*4] of Degradation |
| Comp. Ex. 7 | 60 | 40 | 0 | 0 | 130 | 20 days |
| Ex. 14 | " | " | 1 | " | 43 | 14 |
| Ex. 15 | " | " | 5 | " | 15 | 12 |
| Ex. 16 | " | " | 10 | " | 3 | 10 |
| Ex. 17 | " | " | 0 | 1 | 130 | 8 |
| Ex. 18 | " | " | " | 5 | 90 | 6 |
| Ex. 19 | " | " | " | 10 | 55 | 4 |

[*1]ethylene-carbon monoxide copolymer
[*2]polyethylene oxide with an average molecular weight of 150,000–400,000
[*3]
$$CH_2O-R_1-R_2-H$$
$$CHO-R_1-R_2-H$$
$$CH_2O-R_1-R_2-H$$
$$CH_3$$
$R_1$: $CH_2CHO$
$R_2$: $CH_2CH_2O$

What is claimed is:

1. Granules of fertilizer coated with a resin film consisting essentially of
   (a) an olefin polymer, and
   (b) 0.1 to 10% by weight based on the resin of a polyether polyol selected from the group consisting of
      (1) an ethylene oxide polymer,
      (2) a propylene oxide polymer,
      (3) an ethylene oxide-propylene oxide copolymer, and
      (4) ether products between (1), (2) or (3) and a polyhydric alcohol.

2. A coated granular fertilizer according to claim 1 wherein said olefin polymer is an olefin homopolymer.

3. A coated granular fertilizer according to claim 1 wherein said olefin polymer is an olefin copolymer.

4. A coated granular fertilizer according to claim 1 wherein said olefin copolymer is a copolymer of ethylene and vinyl acetate.

5. A coated granular fertilizer according to claim 1 wherein said olefin polymer is a combination of an olefin homopolymer and an olefin copolymer.

6. A coated granular fertilizer according to claim 5 wherein said combination is a combination of an olefin homopolymer and a copolymer of ethylene and vinyl acetate.

7. A coated granular fertilizer according to claim 5 wherein said combination is a combination of an olefin homopolymer and a copolymer of ethylene and carbon monoxide.

8. A coated granular fertilizer according to claim 5 wherein said combination is a combination of an olefin homopolymer and a copolymer of ethylene and vinyl acetate and a copolymer of ethylene and carbon monoxide.

9. A coated granular fertilizer according to claim 1 wherein the olefin polymer is polyethylene.

10. A coated granular fertilizer according to claim 1 wherein the olefin polymer is a combination of polyethylene and ethylene vinyl acetate copolymer.

11. A coated granular fertilizer according to claim 10 wherein the olefin polymer is polyethylene and the polyether polyol is polyethylene oxide with a molecular weight within the range of 150,000–4,800,000.

12. A coated granular fertilizer according to claim 1 wherein the olefin polymer is a combination of ethylene carbon monoxide copolymer and an ethylene-carbon monoxide-vinyl acetate copolymer.

13. A coated granular fertilizer according to claim 1 wherein the polyether polyol is polyethylene oxide or polypropylene oxide.

* * * * *